Patented Nov. 20, 1951

2,575,373

UNITED STATES PATENT OFFICE 2,575,373

ACYLOXY POLYMETHINE DYE INTERMEDIATES

Earl Van Lare and Leslie G. S. Brooker, Rochester, N. Y., assignors to Eastman Kodak Company, Rochester, N. Y., a corporation of New Jersey No Drawing. Application September 30, 1949, Serial No. 119,008

14 Claims. (Cl. 260—240.8)

1

This invention relates to acyloxy polymethine dye intermediates and to a process for preparing them.

In our copending application Serial No. 18,845, filed April 3, 1948, now U. S. Patent 2,541,015, issued February 13, 1951, we have described a process for obtaining hydroxy cyclammonium alkyl quaternary salts which are free from contaminating alkoxy cyclammonium quaternary salts. The hydroxy cyclammonium quaternary salts described in the aforesaid copending application can be represented by the following general formula:

I.

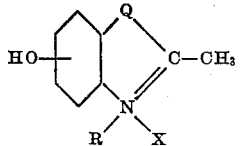

wherein R represents an alkyl group, Q represents an oxygen, a sulfur or a selenium atom and X represents an anion. In our copending application Serial No. 18,846, filed April 3, 1948, now U. S. Patent 2,559,907, issued July 10, 1951, we have described a process for obtaining hydroxy quinaldine alkyl quaternary salts which are free from contaminating alkoxy quinaldine alkyl quaternary salts and which can be represented by the following general formula:

II.

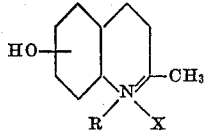

wherein R represents an alkyl group and X represents an anion.

We have now found that cyclammonium quaternary salts of either Formula I or Formula II above can be condensed with a diarylformamidine, in the presence of a carboxylic anhydride, to give acylated β-arylaminovinyl cyclammonium quaternary salts which, however, do not contain a hydroxyl group, but rather an acyloxy group. These acyloxy acylated β-arylaminovinyl cyclammonium quaternary salts are especially useful for the preparation of trimethine cyanine dyes and mercarbocyanine dyes. From the acyloxy polymethine dyes thus prepared, hydroxy polymethine dyes can be prepared by hydrolysis.

It is, accordingly, an object of our invention to provide new acyloxy polymethine dye inter-

2 mediates. A further object is to provide a process for preparing such dye intermediates. Other objects will become apparent hereinafter.

The acyloxy polymethine dye intermediates of our invention can be represented by the following general formula:

III.

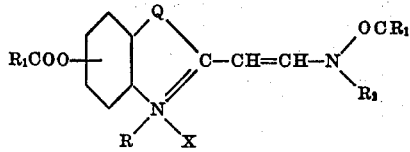

wherein Q represents a member selected from the group consisting of an oxygen atom, a sulfur atom, a selenium atom and a vinylene group, R represents an alkyl group, especially a primary alkyl group, e. g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, β-methallyl, etc., $R_1$ represents an alkyl group, e. g. methyl, ethyl, n-propyl, isopropyl, etc., $R_2$ represents an aryl group, e. g. phenyl, p-chlorophenyl, p-methoxyphenyl, β-naphthyl, etc., and X represents an anion, e. g. chloride, bromide, iodide, benzenesulfonate, p-toluenesulfonate, methylsulfate, ethylsulfate, thiocyanate, perchlorate, acetate, propionate, etc.

In accordance with our invention, these intermediates represented by Formula III are prepared by condensing a hydroxy cyclammonium quaternary salt selected from those represented by the following general formula:

IV.

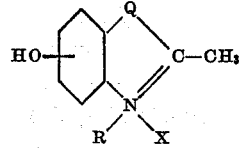

wherein Q, R and X have the values given above, with a diarylformamidine selected from those represented by the following general formula:

V.

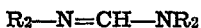

$$R_2-N=CH-NR_2$$

wherein $R_2$ has the values given above, and a carboxylic anhydride selected from those represented by the following general formula:

VI.

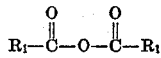

wherein $R_1$ has the values given above.

Heat accelerates the condensation and the condensation is advantageously effected at a temperature of from 90° to 140° C., although higher or lower temperatures can be used.

Typical of the hydroxy cyclammonium quaternary salts represented by Formula IV are: 6-hydroxyquinaldine ethiodide, 7-hydroxyquinaldine methobromide, 7-hydroxyquinaldine ethobromide, 5-hydroxy-2-methylbenzoxazole methiodide, 6-hydroxy-2-methylbenzothiazole methiodide, 6-hydroxy-2-methylbenzothiazole ethiodide, 5-hydroxy-2-methylbenzothiazole methiodide, 5-hydroxy-2-methylbenzothiazole ethiodide, 5-hydroxy-2-methylbenzoselenazole ethiodide, etc.

Typical of the diarylformamidines represented by Formula V above are: diphenylformamidine, di-(p-chlorophenyl)formamidine, di - (p-tolyl)-formamidine, di - (p - methoxyphenyl)formamidine, di-(β-naphthyl)formamidine, etc.

Typical of the anhydrides represented by Formula VI above are: acetic anhydride, propionic anhydride, n-butyric anhydride, isobutyric anhydride, valeric anhydride, etc.

Our new dye intermediates can also be prepared by first condensing a hydroxy quaternary salt of Formula IV with a diarylformamidine of Formula V and then condensing the resulting condensation product with an anhydride of Formula VI. Operating in this manner the initial condensation of hydroxy quaternary salt and diarylformamidine is advantageously carried out at a temperature of from 150° to 200° C., and the subsequent condensation with the carboxylic anhydride is advantageously carried out at 90° to 140° C., although higher or lower temperatures can be employed in each case.

The following examples will serve to illustrate further the manner of practicing our invention.

*Example 1.—2 - β-acetanilidovinyl-6-acetoxybenzothiazole ethiodide*

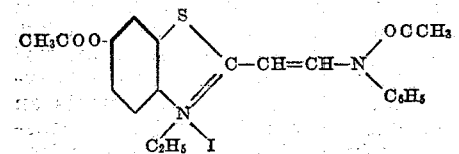

8 g. of 6-hydroxy-2-methylbenzothiazole ethiodide, 5 g. of diphenylformamidine and 40 cc. of acetic anhydride were refluxed together for 30 minutes. The cool, dark reaction mixture was diluted with diethyl ether to precipitate the above formulated compound. The ether was decanted and the residue stirred with acetone. The crystalline solid was filtered off and washed with acetone. 5 g. of product having a melting point of 191° to 194° C. were obtained.

*Example 2.—2 - β-acetanilidovinyl-5-acetoxybenzoxazole ethiodide*

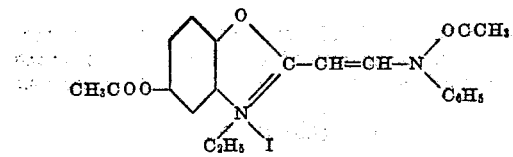

6.1 g. of 5-hydroxy-2-methylbenzoxazole ethiodide, 4.2 g. of diphenylformamidine and 30 cc. of acetic anhydride were mixed in a 200 cc. flask and refluxed for 30 minutes. The reaction mixture was chilled to 0° C. and the solid which separated was filtered off. It was washed with acetone and then with water. 6.6 g. of colorless crystals were obtained.

*Example 3.—2-β-acetanilidovinyl-6-acetoxyquinoline ethiodide*

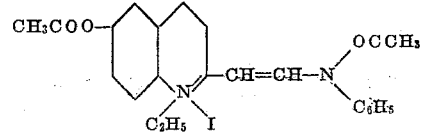

6.3 g. of 6-hydroxyquinaldine ethiodide and 4 g. of diphenylformamidine were fused together in an oil bath at 170° to 175° C. for 10 minutes. The reaction mixture set to a solid which was cooled and then stirred with methyl alcohol, whereupon the material became crystalline. It was filtered off, washed with methyl alcohol and dried. The dried material was refluxed twenty-five minutes with 20 cc. of acetic anhydride. The resulting solution was chilled, the solid filtered off and washed well with acetone. 3.5 g. of product melting at 229 to 231° C. were obtained.

In a manner similar to that illustrated in the foregoing examples 2 - β - acetanilidovinyl-5-acetoxybenzoselenazole ethiodide, 2-β-propionanilidovinyl-5-propionoxybenzoxazole ethiodide, 2-β-butyranilidovinyl-5-butyroxybenzothiazole ethiodide, etc. can be prepared.

The dye intermediates of our invention which are obtained in the iodide form can be converted to the chloride form by heating the iodide with a suspension of silver chloride in methyl alcohol, or with a suspension of silver chloride in phenol, according to the process described in United States Patent 2,245,249, dated June 10, 1941. The bromides can be generated from the chlorides by treating an ethyl alcoholic solution of the chloride with a concentrated aqueous solution of sodium or potassium bromide. The iodides, chlorides or bromides can be converted to perchlorates by treating an ethyl alcoholic solution with a concentrated aqueous solution of sodium perchlorate. The thiocyanates can be made from the iodides by heating the iodides with a suspension of silver thiocyanate.

The dye intermediates of our invention can be condensed, in the presence of an acid-binding agent, with nitrogen-containing heterocyclic ketomethylene compounds which are represented by the following general formula:

VII.

$$H_2C{-}\overset{\displaystyle Z}{\underset{\displaystyle |}{C}}=O$$

wherein Z represents the non-metallic atoms necessary to complete a nitrogen-containing heterocyclic ring, to give acyloxy merocarbocyanine dyes which can be represented by the following general formula:

VIII.

$$R_1COO{-}\!\!\overset{Q}{\diagdown}\!\!C=CH{-}CH=\overset{Z}{C}{-}C=O$$
(with N-R)

wherein Q, R, R₁ and Z have the values given above. These acyloxy merocarbocyanine dyes, upon hydrolysis, give hydroxy merocarbocyanine dyes which can be represented by the following general formula:

IX.

$$HO{-}\!\!\overset{Q}{\diagdown}\!\!C=CH{-}CH=\overset{Z}{C}{-}C=O$$
(with N-R)

wherein Q, R and Z have the values given above.

The condensations which give the acyloxy merocarbocyanine dyes are advantageously carried out in the presence of a tertiary amine acid-binding agent, e. g. trialkylamines (trimethyl, triethyl, tri-n-propyl, triisobutyl, tri-n-butyl, triisoamyl, tri-β-hydroxyethyl, etc. amines), N-alkylpiperidines (N-methyl, N-ethyl, N-n-propyl, N-n-butyl, etc. piperidines) etc. The condensations are advantageously carried out in a solvent, e. g. ethyl, n-propyl, isopropyl, n-butyl or isobutyl alcohols. Heat accelerates the condensations and the condensations are advantageously effected at a temperature of from 60° to 100° C. although higher or lower temperatures can be employed.

Typical of the nitrogen heterocyclic ketomethylene compounds represented by Formula VII are: the rhodanines (e. g. rhodanine, 3-methyl-, 3-ethyl, 3-lauryl, 3-phenyl-, 3-β-hydroxyethyl-, 3-carboxymethyl-, 3-β-carboxyethyl-, 3-p-carboxyphenyl-, 3-p-sulfophenyl-, etc. rhodanines), the 2-thio-2,4(3,5)-oxazolediones (e. g. 3-ethyl-3-lauryl-, 3-carboxymethyl-, 3-p-carboxyphenyl-, 3-p-sulfophenyl-, etc. 2-thio-2,4(3,5)-oxazolediones), the 2-thiohydantoins (e. g. 2-thiohydantoin, 3-ethyl-1-phenyl-, 1,3-diphenyl-, 1-(p-carboxyphenyl)-3-phenyl-, 1-carboxymethyl-3-phenyl-, etc. 2-thiohydrantoins), the barbituric acids (e. g. barbituric acid, 1,3-diethylbarbituric acid, 1-carboxymethyl-3-phenylbarbituric acid, etc.), the thiobarbituric acids (e. g. 2-thiobarbituric acid, 1,3-dimethyl-2-thiobarbituric acid, 1-carboxymethyl-3-phenyl-2-thiobarbituric acid, etc.), etc.

The following examples will serve to illustrate the preparation of our new acyloxy merocarbocyanine dyes.

*Example 4.—5-[(5-acetoxy-3-ethyl-2(3)-benzoxazolylidene)ethylidene]-3-ethylrhodanine*

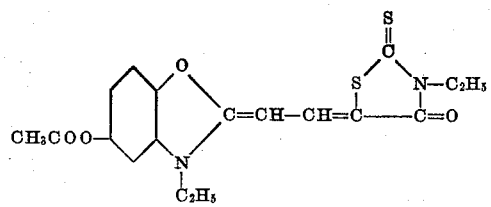

1.2 g. of 5-acetoxy-2-β-acetanilidovinylbenzoxazole ethiodide, 0.5 g. of 3-ethylrhodanine, 10 cc. of absolute ethyl alcohol and 0.27 g. of triethylamine were mixed in a 200 cc. flask and refluxed for 5 minutes. The dye separated in the hot. The reaction mixture was chilled to 0° C. and the separated solid was filtered off, washed with methyl alcohol and dried. A yield of crude dye of 0.7 g. was obtained. The dye was twice recrystallized from a mixture of equal volumes of pyridine and methyl alcohol. It was obtained as fine orange needles, melting at 253-254° C. with decomposition.

*Example 5.—5-[(5-acetoxy-3-ethyl-2(3)-benzoxazolylidene) ethylidene]-3-ethyl-1-phenyl-2-thiohydantoin*

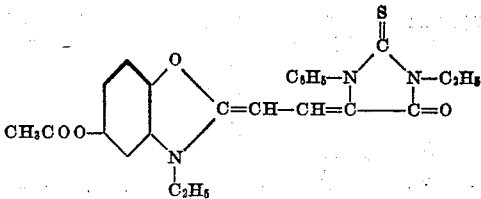

1.2 g. of 2-β-acetanilidovinyl-5-acetoxybenzoxazole ethiodide, 0.55 g. of 3-ethyl-1-phenyl-2-thiohydantoin, 10 cc. of absolute ethyl alcohol and 0.27 g. of triethylamine were mixed in a 200 cc. flask and refluxed for 5 minutes. The reaction mixture was chilled to 0° C. and the dye which separated was filtered off, washed with ethyl alcohol and then with water. It was twice recrystallized from a mixture of equal volumes of pyridine and methyl alcohol. It was obtained as fine orange needles, melting at 258° to 259° C. with decomposition.

In a manner similar to that illustrated in the foregoing Examples 4 and 5 other rhodanines, other 2-thiohydantoins, other 2-thio-2,4(3,5)-oxazolediones, other barbituric acids and other 2-thiobarbituric acids can be condensed with the dye intermediates of our invention to give acyloxy merocarbocyanine dyes.

To prepare the hydroxy merocarbocyanine dyes represented by Formula IX above, the acyloxy merocarbocyanine dyes are advantageously hydrolyzed with an alkali metal hydroxide, e. g. sodium or potassium hydroxide. The hydrolysis is advantageously effected in an alcohol, e. g. methyl, ethyl, or isopropyl alcohol. The following examples will further illustrate the manner of obtaining the hydroxy merocarbocyanine dyes.

*Example 6.—3 - ethyl - 5 - [(3-ethyl-5-hydroxy-2(3)-benzoxazolylidene)-ethylidene]-rhodanine*

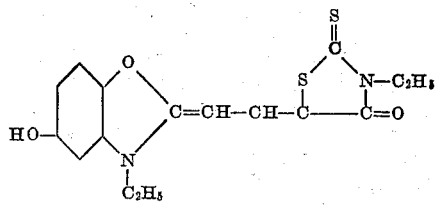

1.2 g. of 5-[(5-acetoxy-3-ethyl-2(3)-benzoxazolylidene)-ethylidene] - 3 - ethylrhodanine and 125 cc. of methyl alcohol were heated to boiling and 1 cc. of 40% (by weight) aqueous sodium hydroxide was added. Boiling was continued for 30 seconds. The hot reaction mixture was filtered and the filtrate cooled to about 20° C. The cooled filtrate was made acid with glacial acetic acid and the mixture was chilled to 0° C. The dye was filtered off, washed with methyl alcohol and twice purified by dissolving in ethyl alcoholic sodium hydroxide and precipitating from such solution with glacial acetic acid. The dye was obtained as fine maroon needles, melting at 294° to 295° C. with decomposition.

*Example 7.—3 - ethyl - 5 - [(3-ethyl-5-hydroxy-2(3) - benzoxazolylidene) - ethylidene] - 1 - phenyl-2-thiohydantoin*

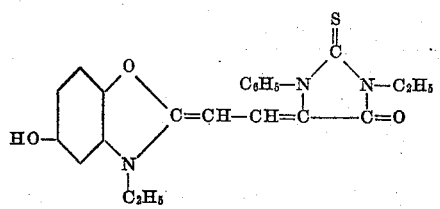

0.35 g. of 5-[(5-acetoxy-3-ethyl-2(3)-benzoxazolylidene) - ethylidene] - 3 - ethyl-1-phenyl-2-thiohydantoin and 100 cc. of methyl alcohol were heated to boiling and 0.3 cc. of 40% (by weight) aqueous sodium hydroxide were added. Boiling was continued for 30 seconds. The resulting solution was filtered hot and the filtrate cooled to about 20° C. The filtrate was made acid with glacial acetic acid and chilled to 0° C. The dye which separated was filtered off and washed with methyl alcohol. The dye was purified by twice dissolving in ethyl alcoholic sodium hydroxide and precipitating therefrom with glacial acetic acid. It was obtained as orange crystals melting at 288° to 290° C. with decomposition.

*Example 8.—1-carboxymethyl - 5 - [(3-ethyl-5-hydroxy - 2(3)-benzoxazolylidene)ethylidene]-3-phenyl-2-thiohydantoin*

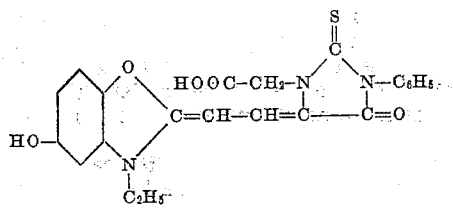

2.5 g. of 2-β-acetanilidovinyl-5-acetoxybenzoxazole ethiodide, 1.25 g. of 1-carboxymethyl-3-phenyl-2-thiohydantoin, 20 cc. of methyl alcohol and 1 g. of triethylamine were mixed in a 200 cc. flask and refluxed for 30 minutes. The reaction mixture was cooled to about 20° C. and made acid with ethyl alcoholic hydrogen chloride. The acid mixture was chilled to 0° C. and poured into cold water. The precipitated acetoxy dye was filtered off and washed with water.

The acetoxy dye (2.1 g.) was dissolved in methyl alcohol and 3 cc. of a 40% (by weight) solution of sodium hydroxide was added. The mixture was heated on a steam bath for 30 seconds. The reaction mixture was filtered hot and the filtrate cooled to about 20° C. The filtrate was made acid with ethyl alcoholic hydrogen chloride, whereupon the hydroxy dye precipitated. The hydroxy dye was filtered off and purified by dissolving in ethyl alcoholic triethylamine and precipitating the dye by acidifying with aqueous acetic acid. The dye was obtained as fine brown needles, melting at 232° to 234° C. with decomposition.

In a manner similar to that illustrated in Examples 7 and 8, the other acyloxymerocarbocyanine dyes of our invention can be hydrolyzed to give hydroxymerocarbocyanine dyes.

The dye intermediates of our invention can be condensed with cyclammonium quaternary salts containing a reactive methyl group, e. g. 2,4-dimethylthiazole quaternary salts, 2-methylbenzothiazole quaternary salts, 2-methylbenzoxazole quaternary salts, 2-methylbenzoselenazole quaternary salts, 2-methyl-4-phenylthiazole quaternary salts, 2,4-dimethylselenazole quaternary salts, quinaldine quaternary salts, lepidine quaternary salts, etc. to give carbocyanine dyes. These condensations are advantageously carried out in the presence of a tertiary amine acid-binding agent, e. g. the tertiary amine acid-binding agents set forth above.

The following example will serve to illustrate the manner of preparing acyloxy carbocyanine dyes.

*Example 9.—5 - Acetoxy-3,3'-diethyl-4'-methyl-oxathiazolocarbocyanine iodide*

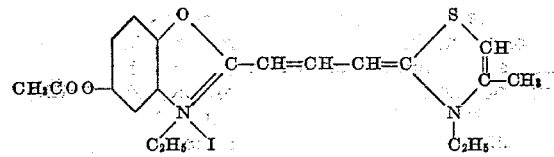

1.2 g. of 2-β-acetanilidovinyl-5-acetoxybenzoxazole ethiodide, 0.68 g. of 2,4-dimethylthiazole ethiodide, 10 cc. of absolute ethyl alcohol and 0.27 g. of triethylamine were mixed in a 200 cc. flask and refluxed for 10 minutes. The reaction mixture was chilled to 0° C. and the acetoxy dye which separated was filtered off, washed with acetone, and then with water. The dye was twice recrystallized from ethyl alcohol and obtained as red crystals melting at 217° to 218° C. with decomposition.

In a manner similar to that illustrated in the foregoing example, 2-methyl - 4 - phenylthiazole ethiodide, 2-methylbenzothiazole etho-p-toluenesulfonate, quinaldine ethiodide, etc. can be condensed with 2-β-acetanilidovinyl-5-acetoxybenzoxazole ethiodide and other of our new acyloxy intermediates, to give acyloxy carbocyanine dyes.

The acyloxy carbocyanine dyes can be hydrolyzed to give hydroxycarbocyanine dyes by hydrolyzing with an alkali metal hydroxide, e. g. sodium or potassium hydroxide, in an alcohol, e. g. methyl, ethyl or isopropyl alcohol. The following example will further illustrate the manner of obtaining hydroxycarbocyanine dyes.

*Example 10.—3,3'-diethyl-5-hydroxy-4'-methyl-oxathiazolocarbocyanine iodide*

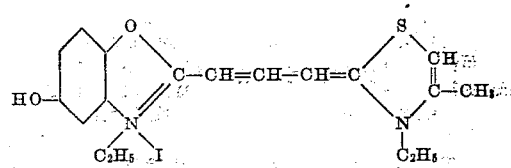

0.5 g. of 5-acetoxy-3,3'-diethyl-4'-methyloxathiazolocarbocyanine iodide and 10 cc. of ethyl alcohol were heated to boiling and 0.2 cc. of 40% (by weight) sodium hydroxide were added. Boiling was continued for 30 seconds. The hot solution was filtered and the filtrate cooled to about 20° C. The cool filtrate was made acid with glacial acetic acid and the mixture chilled to 0° C. The hydroxy dye which separated was filtered off and washed lightly with ethyl alcohol. The dye was recrystallized from ethyl alcohol and obtained as lustrous red crystals, melting at 253° to 254° C. with decomposition.

In a similar manner, other acyloxy carbocyanine dyes obtained in accordance with our invention can be hydrolyzed to hydroxy carbocyanine dyes.

Ketomethylene compounds of Formula VII containing acid groups are described, for example, in the copending application of Leslie G. S. Brooker and Grafton H. Keyes Serial No. 605,473, filed July 16, 1945 (now United States Patent No. 2,493,748, dated January 10, 1950), and in the copending application of Leslie G. S. Brooker and Frank L. White Serial No. 605,472, filed July 16, 1945 (now United States Patent No. 2,493,747, dated January 10, 1950). Still other heterocyclic ketomethylene compounds containing acid groups are described in the following examples.

*Example 11.—1 - carboxymethyl - 3 - phenyl-2-thiobarbituric acid*

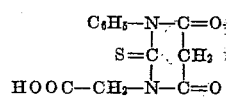

23.8 g. (1 mol) of N-carbethoxymethyl-N'-phenylthiourea, 10.4 g. (1 mol) of malonic acid and 50 cc. of acetic acid were heated together on a steam bath. 50 cc. of acetic anhydride were then added dropwise over a period of about 1½ hours. The excess of acetic anhydride was decomposed by adding 25 cc. of warm water and heating the mixture on the steam bath for 10 minutes. The resulting acetic acid solution of the 1-carbethoxymethyl-3-phenyl-2-thiobarbituric acid was concentrated to small volume. Hydrolysis of the ester was brought out by dissolving in dilute aqueous sodium hydroxide (10% by weight) and refluxing for about 5 minutes. The alkaline solution was filtered hot and the filtrate then chilled. The filtrate was acidified with hydrochloric acid, whereupon the 1-carboxymethyl-3-phenyl-2-thiobarbituric acid separated as a sticky semisolid. It was collected on a filter and washed with methyl alcohol. Upon drying, it was obtained as a light brownish powder.

The N - carbethoxymethyl-N'-phenylthiourea employed above was prepared as follows:

13.5 g. (1 mol) of phenylisothiocyanate and 13.9 g. (1 mol.) of glycine ethyl ester hydrochloride were dissolved in 25 cc. of boiling absolute ethyl alcohol. To this solution were added 10.1 g. (1 mol.) of triethylamine and the mixture was refluxed for 15 minutes. After cooling, the solution was poured into 150 cc. of cold water. The product separated as an oil. It was allowed to solidify, filtered off and washed with water. It was recrystallized from methyl alcohol and obtained as colorless crystals, melting at 83° to 86° C.

The 1-carboxymethyl-3-phenyl-2-thiobarbituric acid can be condensed with the acyloxy intermediates of our invention to give acyloxy merocarbocyanine dyes. It can also be condensed with 2-β-acetanilidovinylbenzoxazole ethiodide, in pyridine, to give (after acidification with hydrochloric acid) 1 - carboxymethyl-5-[(3-ethyl-2(3)-benzoxazolylidene)ethylidene] - 3 - phenyl-2-thiobarbituric acid, a reddish crystalline powder, melting at 204° to 206° C. with decomposition.

*Example 12.—1 - carboxymethyl-3-phenylbarbituric acid*

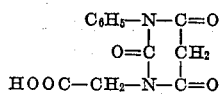

11.1 g. (1 mol.) of N-carbethoxymethyl-N'-phenylurea (Bailey, Jour. Am. Chem. Soc. 28, 394 (1902) and 5.2 g. (1 mol.) of malonic acid were suspended in 100 cc. of dry chloroform. 15.4 g. of phosphorus oxychloride were added and the mixture was refluxed for six hours. Solvents were then distilled off and the residue was extracted with dilute aqueous sodium bicarbonate and the aqueous layer was filtered. On acidification of the filtrate with hydrochloric acid, the 1-carboxymethyl-3-phenylbarbituric acid separated as a sticky mass. This mass was dissolved in 10% (by weight) aqueous sodium hydroxide and the solution refluxed for 30 minutes to insure hydrolysis of the ester. Upon acidifying the cool reaction mixture with dilute hydrochloric acid, the 1-carboxymethyl - 3 - phenylbarbituric acid separated in a crystalline state.

The 1-carboxymethyl-3-phenylbarbituric acid can be condensed with the acyloxy intermediates of our invention to give merocarbocyanine dyes. It can also be condensed with 2-(4-methoxy-1,3-butadienyl)benzoxazole ethiodide, in ethyl alcohol containing triethylamine, to give 1-carboxymethyl - 5 - [(3-ethyl-2(3)-benzoxazolylidene)-butenylidene]-3-phenylbarbituric acid — minute purple crystals melting at 240° to 242° C. with decomposition.

The new acyloxy merocarbocyanine dyes, the new hydroxy merocarbocyanine dyes, the new acyloxy carbocyanine dyes and the new hydroxy carbocyanine dyes of our invention can be employed to sensitize photographic silver halide emulsions. To prepare photographic emulsions sensitized with our new dyes, it is only necessary to disperse the dyes in the emulsions. It is convenient to add the dyes to the emulsions from solutions in appropriate solvents. Methyl alcohol has proven satisfactory for this purpose. Ethyl alcohol can also be used. Sensitization by means of these dyes is, of course, directed primarily to the ordinarily employed gelatino-silver-halide developing-out emulsions. The dyes (one or more) are ordinarily incorporated in the washed, finished emulsions and should, of course, be uniformly distributed throughout the emulsion. The concentration of the dyes in the emulsions can vary widely, i. e. from about 5 to about 100 mg. per liter of flowable emulsion. The concentration of the dye will vary according to the type of light-sensitive material in the emulsion and according to the effect desired. The suitable and most economical concentration for any given emulsion will be apparent to those skilled in the art of emulsion making. To prepare a gelatino-silver-halide emulsion sensitized with one more of these dyes, the following procedure is satisfactory. A quantity of the dye is dissolved in methyl alcohol or other suitable solvent, and a volume of this solution (which may be diluted with water) containing from 5 to 100 mg. of dye is slowly added to 1000 cc. of gelatino-silver-halide emulsion, with stirring. Stirring is continued until the dye is uniformly distributed throughout the emulsion. With most of these sensitizing dyes, 10 to 20 mg. of dye per liter of emulsion suffices to produce the maximum sensitizing effect with the ordinary gelatino-silver-bromide (including bromiodide) emulsions. With gelatino - silver - chloride emulsions somewhat larger concentrations may be required to produce the optimum sensitizing effect. The above statements are only illustrative and are not to be understood as limiting our invention, as it will be apparent that these dyes can be incorporated by bathing a plate or film upon which an emulsion has been coated, in a solution of the dye in an appropriate solvent. Bathing methods, however, are not to be preferred ordinarily. E however, are not to be preferred ordinarily.

Emulsions sensitized with our new dyes can be coated on the usual supports of paper, cellulose acetate film, cellulose nitrate film, glass, polyvinyl acetal film, etc., in the usual manner.

What we claim as our invention and desire to be secured by Letters Patent of the United States is:

1. The acyloxy dye intermediates which are represented by the following general formula:

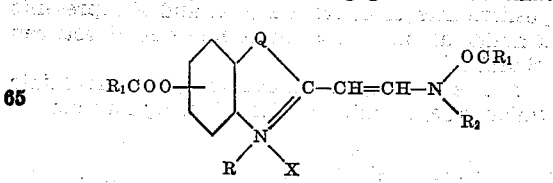

wherein R represents an alkyl group, R₁ represents an alkyl group, R₂ represents an aryl group, Q represents a member selected from the group consisting of an oxygen atom, a sulfur atom, a selenium atom and a vinylene group and X represents an anion.

2. The acetoxy dye intermediates which are represented by the following general formula:

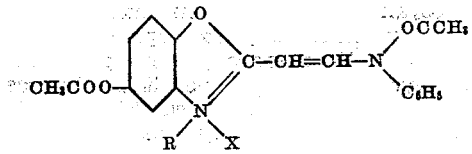

wherein R represents a primary alkyl group of the formula $C_nH_{2n+1}$ wherein $n$ represents a positive integer of from 1 to 4, and X represents a halide anion having an atomic weight between 35 and 127.

3. The acetoxy polymethine dye intermediate which is represented by the following formula:

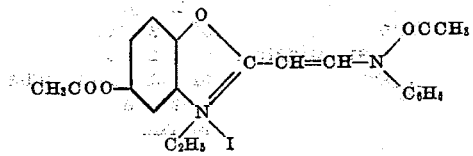

4. The acetoxy polymethine dye intermediates which are represented by the following general formula:

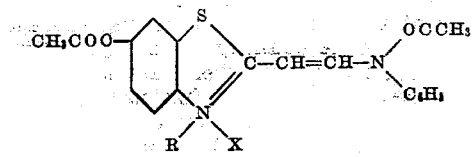

wherein R represents a primary alkyl group of the formula $C_nH_{2n+1}$ wherein $n$ represents a positive integer of from 1 to 4, and X represents a halide anion having an atomic weight between 35 and 127.

5. The acetoxy polymethine dye intermediate which is represented by the following formula:

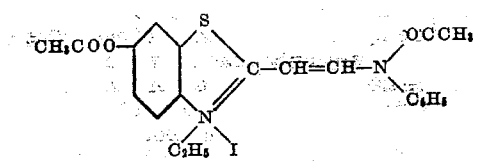

6. The acetoxy polymethine dye intermediates which are represented by the following general formula:

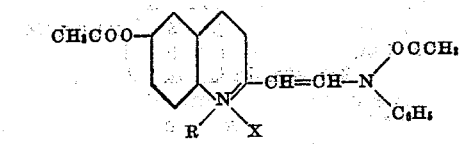

wherein R represents a primary alkyl group having the formula $C_nH_{2n+1}$ wherein $n$ represents a positive integer of from 1 to 4, and X represents a halide anion having an atomic weight between 35 and 127.

7. The acetoxy polymethine dye intermediate which is represented by the following formula:

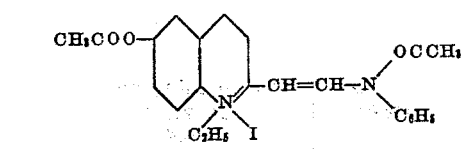

8. A process for preparing an acyloxy polymethine dye intermediate comprising condensing a hydroxy cyclammonium quaternary salt selected from those having the following general formula:

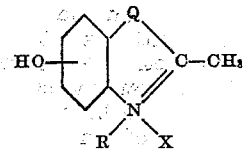

wherein Q represents a member selected from the group consisting of an oxygen atom, a sulfur atom, a selenium atom and a vinylene group, R represents an alkyl group and X represents an anion, with a diarylformamidine selected from those having the following general formula:

$$R_2-N=CH-NR_2$$

wherein $R_2$ represents an aryl group selected from the group consisting of aryl groups of the benzene series and aryl groups of the naphthalene series, in a carboxylic anhydride selected from those represented by the following general formula:

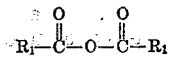

wherein $R_1$ represents an alkyl group.

9. A process for preparing an acetoxy polymethine dye intermediate comprising condensing a hydroxy cyclammonium quaternary salt selected from those represented by the following general formula:

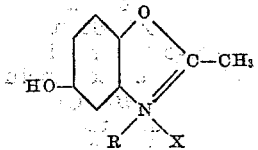

wherein R represents a primary alkyl group having the formula $C_nH_{2n+1}$ wherein $n$ represents a positive integer of from 1 to 4, and X represents a halide anion having an atomic weight between 35 and 127, with diphenylformamidine, in acetic anhydride.

10. A process for preparing an acetoxy polymethine dye intermediate comprising condensing 5-hydroxy-2-methylbenzoxazole ethiodide with diphenylformamidine, in acetic anhydride.

11. A process for preparing an acetoxy polymethine dye intermediate comprising condensing a hydroxy cyclammonium quaternary salt selected from those represented by the following general formula:

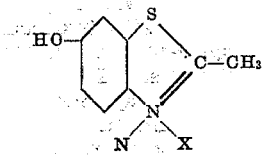

wherein R represents a primary alkyl group having the formula $C_nH_{2n+1}$ wherein $n$ represents a positive integer of from 1 to 4, and represents a halide anion having an atomic weight between 35 and 127, with diphenylformamidine, in acetic anhydride.

12. A process for preparing an acetoxy polymethine dye intermediate comprising condensing 6-hydroxy-2-methylbenzothiazole ethiodide with diphenylformamidine, in acetic anhydride.

13. A process for preparing an acetoxy polymethine dye intermediate comprising condensing a hydroxy cyclammonium quaternary salt selected from those represented by the following general formula:

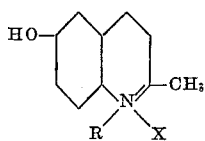

wherein R represents a primary alkyl group having the formula $C_nH_{2n+1}$ wherein $n$ represents a positive integer of from 1 to 4, and X represents a halide anion having an atomic weight between 35 to 127, with diphenylformamidine, in acetic anhydride.

14. A process for preparing an acetoxy polymethine dye intermediate comprising condensing 6-hydroxyquinaldine ethiodide with diphenylformamidine, in acetic anhydride.

EARL VAN LARE.
LESLIE G. S. BROOKER.

No references cited.